United States Patent
Peless et al.

(10) Patent No.: US 6,615,108 B1
(45) Date of Patent: Sep. 2, 2003

(54) AREA COVERAGE WITH AN AUTONOMOUS ROBOT

(75) Inventors: Ehud Peless, Even Yehuda (IL); Shai Abramson, Pardessia (IL); Ronen Friedman, Hod Hasharon (IL); Ilan Peleg, Tsur Yigal (IL)

(73) Assignee: F. Robotics Acquisitions Ltd., Kadima (IL)

( * ) Notice: Subject to any disclaimer, the term of this patent is extended or adjusted under 35 U.S.C. 154(b) by 0 days.

(21) Appl. No.: 09/700,211

(22) PCT Filed: May 11, 1999

(86) PCT No.: PCT/IL99/00248
§ 371 (c)(1),
(2), (4) Date: Apr. 13, 2001

(87) PCT Pub. No.: WO99/59042
PCT Pub. Date: Nov. 18, 1999

(30) Foreign Application Priority Data

May 11, 1998 (IL) ................................................ 124413

(51) Int. Cl.[7] .............................................. G06F 19/00
(52) U.S. Cl. ...................... 700/245; 700/253; 700/254; 700/255; 700/258; 700/262; 700/302; 318/568.12; 318/580; 318/581; 318/587; 180/167; 180/168; 180/169; 180/211; 701/1; 701/50; 701/213
(58) Field of Search ............................... 700/245, 253, 700/254, 255, 258, 262, 302; 701/23, 25, 1, 213, 50; 318/568.12, 580, 587, 581; 180/211, 160, 167, 169

(56) References Cited

U.S. PATENT DOCUMENTS

| | | | |
|---|---|---|---|
| 4,829,442 A | 5/1989 | Kadonoff et al. ............ 364/449 |
| 4,919,224 A | 4/1990 | Shyu et al. .................. 180/168 |
| 4,996,468 A | 2/1991 | Field et al. .................. 318/587 |
| 5,163,273 A | * 11/1992 | Wojtkowski et al. ........ 180/211 |
| 5,170,352 A | 12/1992 | McTamaney et al. .. 364/424.02 |
| 5,204,814 A | * 4/1993 | Noonan et al. ........ 318/568.12 |
| 5,321,614 A | 6/1994 | Ashworth .............. 364/424.02 |
| 5,502,638 A | 3/1996 | Takenaka ............... 364/424.02 |
| 5,677,836 A | 10/1997 | Bauer .................. 364/424.027 |
| 5,928,309 A | * 7/1999 | Korver et al. .............. 342/359 |
| 5,938,704 A | * 8/1999 | Torii .......................... 180/168 |
| 6,088,644 A | * 7/2000 | Brandt et al. ................. 172/4.5 |
| 6,255,793 B1 | * 7/2001 | Peless et al. ................ 318/580 |
| 6,338,013 B1 | * 1/2002 | Ruffner ....................... 180/167 |
| 6,339,735 B1 | * 1/2002 | Peless et al. .................. 701/23 |
| 6,417,641 B2 | * 7/2002 | Peless et al. ................ 318/580 |
| 2002/0049517 A1 | * 4/2002 | Ruffner ........................ 701/1 |

FOREIGN PATENT DOCUMENTS

| | | |
|---|---|---|
| EP | 0 774 702 A2 | 5/1997 |
| JP | 408255018 A * | 10/1996 |
| JP | 409128045 A * | 5/1997 |
| WO | WO 96/38770 | 12/1996 |

OTHER PUBLICATIONS

Robotic & Automation at Lulea University, Robots at the robotics deparmetn, no date, Internet, pp. 1–2.*
Hicks et al., A survey of robot lawn mowers, 2000, Internet, pp. 1–8.*

(List continued on next page.)

Primary Examiner—William A Cuchlinski, Jr.
Assistant Examiner—McDieunel Marc
(74) Attorney, Agent, or Firm—Polsinelli Shalton & Welte

(57) ABSTRACT

There is therefore provided, in accordance with a preferred embodiment of the present invention, a robotic system for systematically moving about an area to be covered. The system includes at least one boundary marker (48) located along the outer edge of the area to be covered, a robot (40) with a navigation system (41) and a sensor unit (43). The navigation system (41) navigates the robot (40) in generally straight, parallel lines from an initial location and turns the robot (40) when the robot (40) encounters one of the boundary markers (48), thereby to systematically move about the area to be covered. The sensor unit (43) senses proximity to one of the at least one boundary marker (48).

10 Claims, 4 Drawing Sheets

OTHER PUBLICATIONS

Irigoyen et al., RoboMow evaluation, 2000, Internet, pp. 1–9.*

Chandler et al., The next generation autonomous lawn mower, 2000, Internet, p. 1.*

Chandler et al., LawnShark: A new platform for autonomous mowing and navigation, 1999, Internet. pp. 1–5.*

Schelxig, Robomow, Mow, Mow your loan, Friday, Sep. 22, 2000, Internet/Washington Post, pp. 1–3.*

Redazione Internet Magazine, Self operating lawn mower, 2000, Internet, p. 1, (itportal.it/tech/misc/selfoperating).*

LawnNibbler, th automatic lawn mowing system, 1999, Internet, pp. 1–2, (lawnnibbler.com).*

George's Mower Service, Fully automatic lawn mower from george's mower service in Riverniew Florida, no date, Internet, pp. 1–2.*

Ehud Peless et al., *Navigation Method and System for Lawn Mowers and Other Autonomous Machines*, U.S. patent application Ser. No. 08/554,691, filed Nov. 7, 1995.

* cited by examiner

AREA COVERAGE WITH AN AUTONOMOUS ROBOT

FIELD OF THE INVENTION

The present invention relates to autonomous robots generally and to autonomous robots which move through an area in particular.

BACKGROUND OF THE INVENTION

Autonomous robots are known in the art and have been implemented as household appliances, such as a lawnmower or a vacuum cleaner. These household appliances operate by moving about an area to be processed such that the entire area is covered by the end of the operation.

Reference is now made to FIGS. 1A and 1B, which illustrate the operation of one exemplary autonomous robot, described in U.S patent application (Ser. No.) 08/554,691, filed Nov. 7, 1995, now U.S. Pat. No. 6,255,793, and assigned to the common assignees of the present invention. U.S. patent application (Ser. No.) 08/554,691 is incorporated herein by reference. FIG. 1A illustrates the area in which the robot 10 operates and FIG. 1B illustrates the elements, in block diagram form, of robot 10.

The autonomous robot 10 operates within an area marked with boundary markers 12A. If there are fixed obstacles 14 in the area, such as flower beds, trees, columns, walls, etc., these obstacles are rimmed with further boundary markers 12B. The boundary markers 12 can be of any suitable type, such as an electrified wire, bar coded posts, a radioactive posts, etc. The term "marker" will be used herein for both posts and wires.

As shown in FIG. 1B, the robot 10 includes a navigation system 20 which receives data from an edge sensor 22 which senses when the robot 10 approaches a boundary marker 12 where, if the marker is a continuous wire, the term "marker" indicates the section of the wire near the current location of the robot. The navigation system 20 also receives data from an odometer 24 which measures the distance the robot 10 has moved and a compass 26 which measures the current location of the robot 10.

Initially, the robot 10 is placed within the area to be covered. The robot 10 moves toward the boundary (if it did not begin near it) and then, as indicated by arrows 32, moves along the boundary, following the boundary markers 12. During this process, the robot 10 uses the location information from the compass to produce a map 28 (FIG. 1B) of the area to be covered.

Once the map is complete, the robot 10 moves about the area to be covered. Whenever it approaches a boundary marker 12, as sensed by the edge sensor 22, the robot 10 changes direction and continues until it reaches another boundary marker 12. If the boundary marker 12 appeared close to, but not at, its expected position, navigation system 20 updates the map 28 to match the new information.

If the boundary marker 12 is sensed substantially within the area, as determined by a comparison of the output of the compass 26 and the information in the map 28, the boundary marker 12 must be one which surrounds the obstacle 14. The robot 10 changes direction and continues until it reaches another boundary marker 12. The robot 10 moves about the area to be covered until it has determined that all sections of the map 28 have been covered.

However, it will be appreciated that creating the map 28 of the shape of the area to be covered is time consuming. Due to the inaccuracies of the compass 26 and odometer 24, it is also typically error prone.

SUMMARY OF THE INVENTION

Applicants have realized that, if the robot works systematically within the area to be covered, there is no need to create the map.

It is therefore an object of the present invention to provide an autonomous robot, for performing area coverage, which does not create a map of the area to be covered.

There is therefore provided, in accordance with a preferred embodiment of the present invention, a robotic system for systematically moving about an area to be covered. The system includes at least one boundary marker located along the outer edge of the area to be covered, a robot with a navigation system and a sensor unit. The navigation system navigates the robot in generally straight, parallel lines from an initial location and turns the robot when the robot encounters one of the boundary markers, thereby to systematically move about the area to be covered. The sensor unit senses proximity to one of the at least one boundary marker.

Additionally, in accordance with a preferred embodiment of the present invention, the sensor unit includes a unit for indicating proximity to an obstacle within the area to be covered and the navigation system includes a unit for turning the robot when the unit for indicating indicates proximity to an obstacle.

Moreover, in accordance with a preferred embodiment of the present invention, the unit for indicating is either a contact sensor or a proximity sensor.

Further, in accordance with a preferred embodiment of the present invention, the navigation system includes a unit for counting the number of laps need to cover the area between an obstacle and a boundary marker.

Still further, in accordance with a preferred embodiment of the present invention, the system includes at least one obstacle marker located along the outer edge of the obstacle.

Moreover, in accordance with a preferred embodiment of the present invention, the at least one boundary marker is an electrified wire receiving a first signal and the at least one obstacle marker is an electrified wire receiving a second signal.

Alternatively, in accordance with a preferred embodiment of the present invention, the at least one boundary marker is a post having a first bar code and the at least one obstacle marker is a post having a second bar code.

There is also provided, in accordance with a preferred embodiment of the present invention, a robotic system for systematically moving about an area to be covered. The system includes at least one boundary marker located along the outer edge of the area to be covered, at least one obstacle marker located along the outer edge of an obstacle within the area to be covered, a robot for moving about the area to be covered and a sensor unit for sensing proximity to the boundary and obstacle markers and for differentiating between the boundary and obstacle markers.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1A:
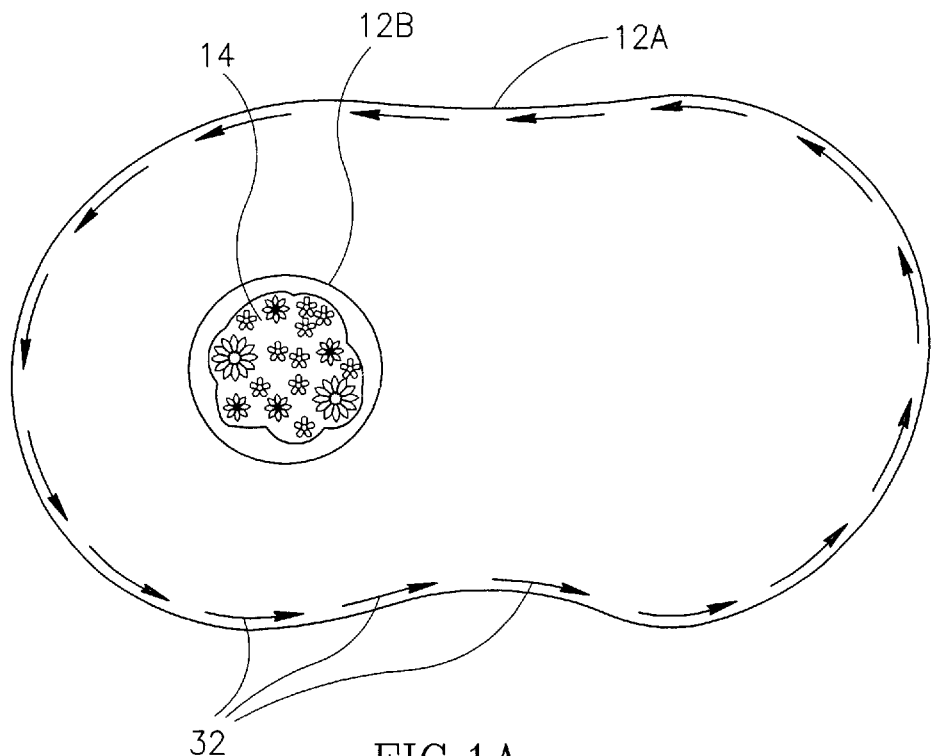
FIG. 1A is a schematic illustration of an area to be covered and the initial movement of a prior art robot within the area.
Figure 1B:
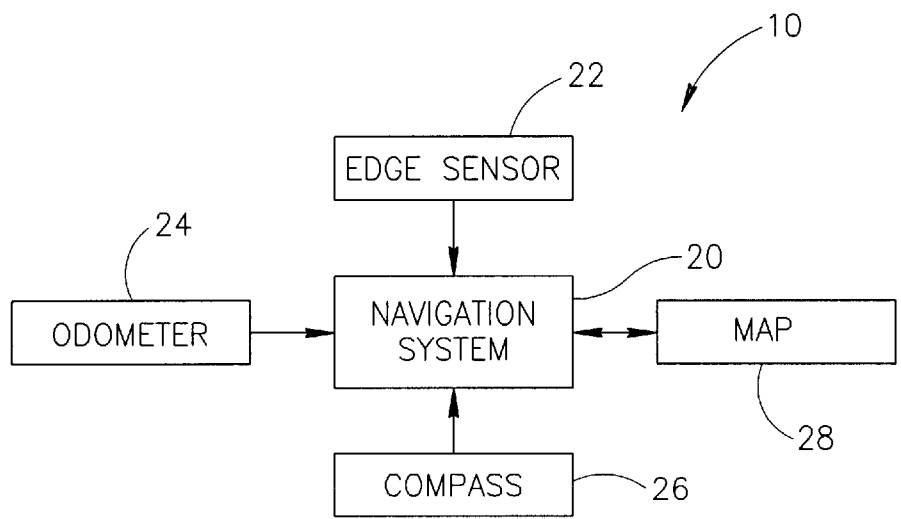
FIG. 1B is a block diagram illustration of the prior art robot.
Figure 2A:
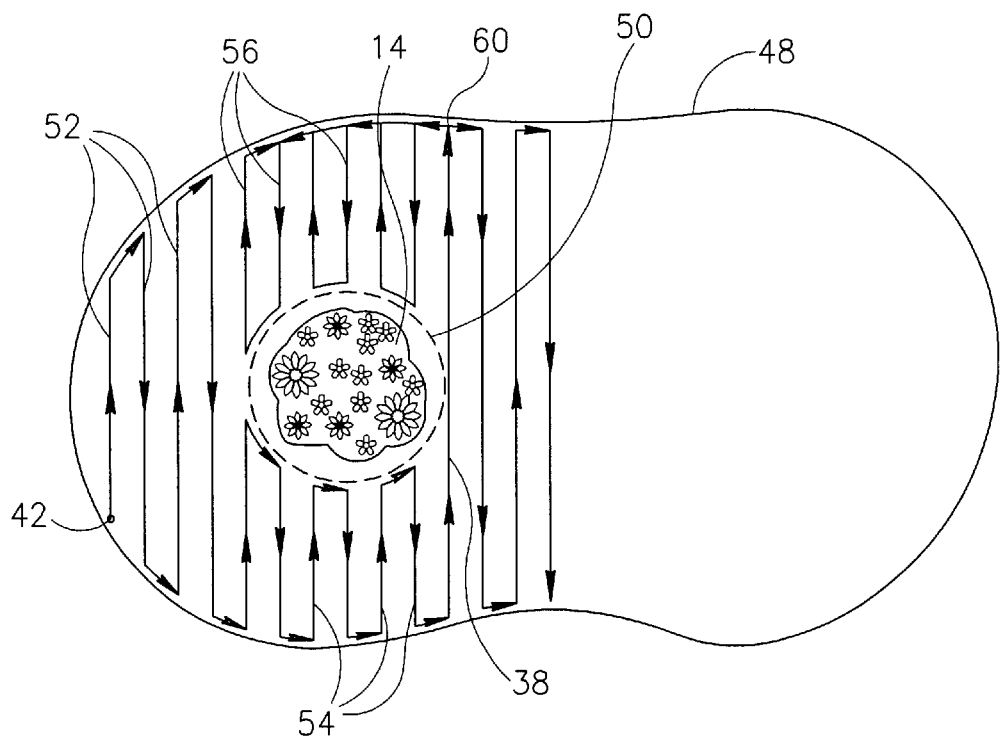
FIG. 2A is a schematic illustration of an area to be covered and the movement of a robot of the present invention within the area.
Figure 2B:
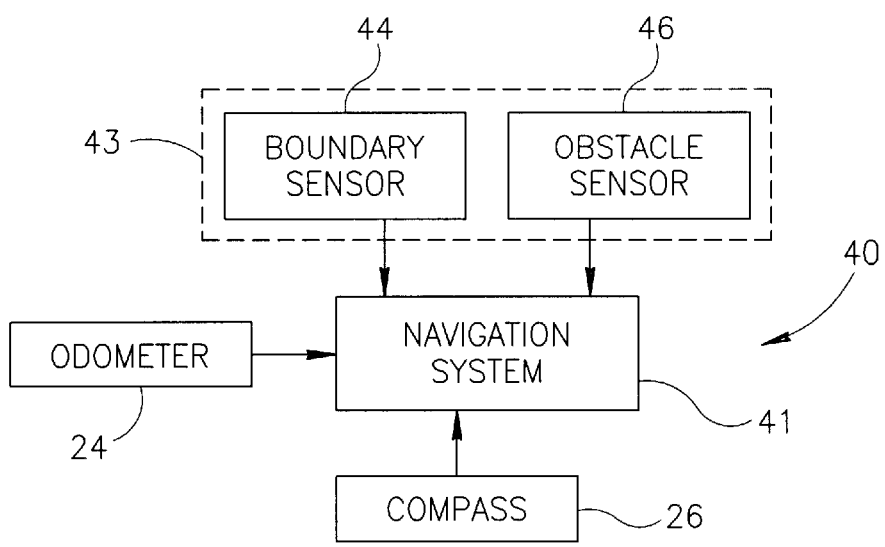
FIG. 2B is a block diagram illustration of a robot, constructed and operative in accordance with a preferred embodiment of the present invention.

Reference is now made to FIGS. 2A and 2B which illustrate the movement of a robot 40 of the present invention and the elements of the robot, respectively. Similar reference numerals refer to similar elements.

In accordance with a preferred embodiment of the present invention, robot 40 does not create a map of the area to be covered. Instead, it systematically scans within the area, moving in a straight direction from one boundary marker to the next. To do so, it must initially be placed relatively close to one extreme edge of the boundary, for example at starting point 42, and faced in the desired direction of scanning.

As can be seen in FIG. 2B, the robot 40 utilizes the odometer 24 and compass 26 but comprises a navigation system 41 and a sensor system 43, shown as two sensors 44 and 46, for separately sensing the boundary and the obstacles, respectively. Accordingly, there can be two different types of markers, boundary markers 48 and obstacle markers 50. The boundary markers 48 and obstacle markers 50 can be of any suitable types, as detailed hereinbelow.

Alternatively, for obstacles which stick above the ground, such as trees and furniture, the obstacle sensors can be proximity and/or contact sensors. For this system, there is no need for obstacle markers and only boundary markers are utilized.

It will be appreciated that without a map, robot 40 does not know its position within the area to be scanned; it only knows its absolute position. Using position information, robot 40 scan the area, moving in a generally straight line from one marker to the next, as determined by sensor system 43. Using the output of compass 26, the navigation system 41 then turns robot 40 generally 180° whenever it encounters a new marker. The navigation system 41 also ensures that the new "lap" is beside, and possibly slightly overlapping, the previous lap, thereby to ensure full coverage of the area to be covered. This is described in detail in U.S. patent application Ser. No. 08/554,691.

In general, robot 40 moves in generally straight, parallel lines between two boundary markers 48, as indicated by arrows 52. However, if sensor system 43 indicates that the robot 40 is close to an obstacle marker 50, the navigation system 41 causes the scan to occur between boundary markers 48 and obstacle markers 50, as indicated by arrows 54, counting the number of laps until the obstacle is passed. The next lap, arrow 38, brings the robot 40 to a boundary marker 48 on the other side of the obstacle 14. The robot 40 then performs a scan in the opposite direction, between the boundary markers 48 and the obstacle markers 50, to cover the area behind the obstacle 14. This scan is shown with arrows 56 and involves the same number of laps as for the first side of the obstacle 14.

Once the scan behind the obstacle 14 is finished, the robot 40 follows the boundary markers 48 until it reaches the point, labeled 60, where it began the scan behind the obstacle 14, at which point, it continues normal scanning between boundary markers 48.

Alternatively, the scan behind the obstacle 14 can be performed without counting laps. Instead, the scan continues until the obstacle 14 has been passed. This requires noting the location of the robot 10 near the boundary when the robot 10 begins the scan behind the obstacle 14 so that the robot 10 can be returned to that location once the scan behind the obstacle 14 is finished.

It will be appreciated that, by scanning systematically between boundary and obstacle markers, the present invention covers the area to be covered without having to produce a map of the area.

Figure 3A:
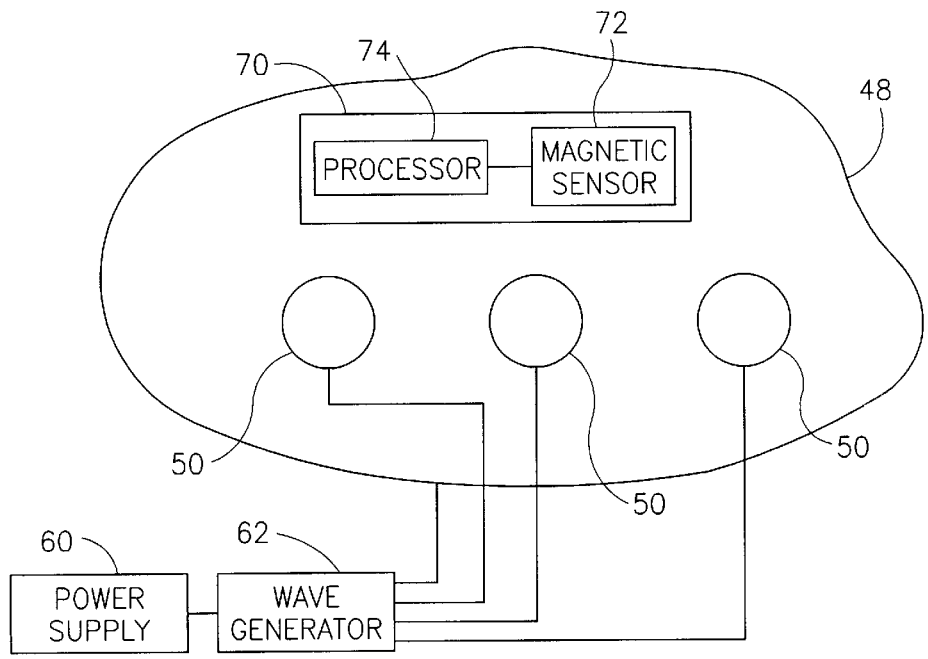
FIG. 3A is a schematic illustration of one embodiment of boundary and obstacle markers.
Figure 3B:
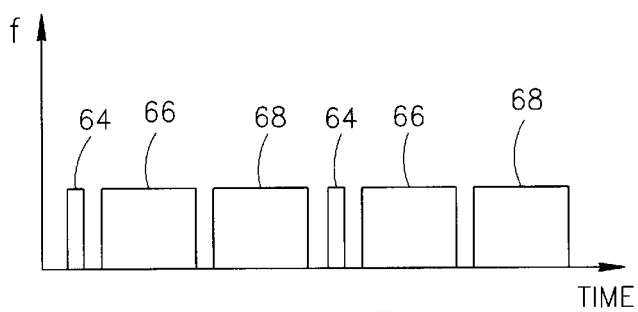
FIG. 3B is a timing diagram operative for the embodiment of FIG. 3A.
Figure 3C:
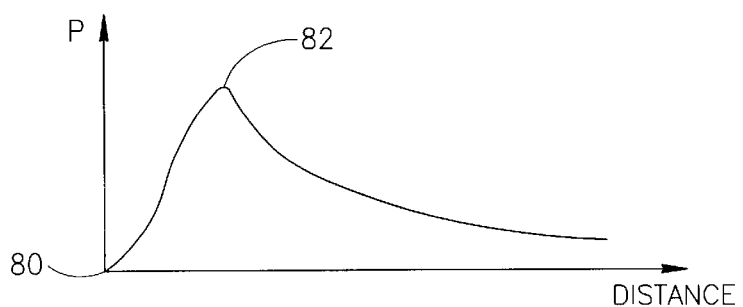
FIG. 3C is a graphical illustration of the signal strength of a magnetic sensor as a function of distance from the markers of FIG. 3A.

Reference is now made to FIGS. 3A, 3B and 3C which respectively illustrate one set of boundary and obstacle markers formed of wires, a timing diagram for the markers and a graph of signal strength as a function of distance from the wire.

In this embodiment, both the boundary marker 48 and the multiple obstacle markers 50 are formed of wires connected to a power supply 60 via a wave generator 62. The wave generator 62 provides one type of signal for the boundary marker 48 and another type of signal to all of the obstacle markers 50.

For example, the signal for marker 48 might be of one frequency while the signal for markers 50 might be of a second frequency. In this embodiment, the wave generator 62 includes two separate elements, each of which produces one of the two frequencies and provides it to the appropriate set of wires.

Alternatively and as shown in FIG. 3B, the signals can be time shared. In this embodiment, a short synchronization pulse 64 is followed by a boundary signal 66 for marker 48 after which an obstacle signal 68 for markers 50 is provided. The sequence repeats. The marker is determined to be a boundary marker or an obstacle marker by the length of time from the most recent synchronization pulse 64.

It will be appreciated that, for both embodiments, the robot, labeled 70, has a single magnetic sensor 72 for sensing the signals from wave generator 62 and a processor 74 for determining if the type of signal based on the frequency of the transmission, in the first embodiment, or based on the timing of the transmission, in the second embodiment. Alternatively, for the second embodiment, the robot 70 can have separate receivers, each tuned to the relevant frequency, and separate processors for each receiver to determine if the received signal is strong enough to indicate proximity.

FIG. 3C schematically illustrates the strength of the signal as a function of distance from the location of the wire. When the sensor 72 is on top of the wire, no signal is received (point 80). As the sensor 72 moves away from the wire, the signal increases sharply, reaching a peak 82 within 50 cm. The signal then slowly decays as the sensor 72 moves further away from the wire. Thus, as the robot 70 approaches the wire, the signal will slowly increase in strength. Acceptable proximity can be defined as once peak 82 has been reached or any time after peak 82 has been reached.

Figure 4:
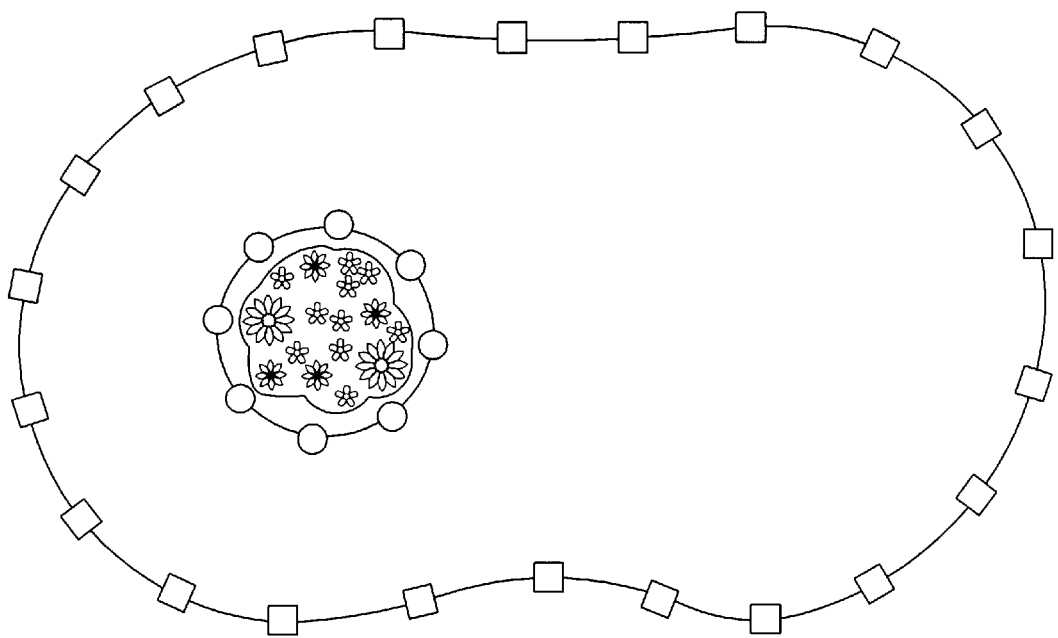
FIG. 4 is a schematic illustration of an alternative embodiment of boundary and obstacle markers.

Reference is now made to FIG. 4 which illustrates an alternative embodiment of the boundary and obstacle markers 48 and 50, respectively. In this embodiment, the markers are formed of posts, each having a different bar code written thereon. FIG. 4 uses squares to indicate the boundary markers 48 and circles to indicate obstacle markers 50. In this embodiment, as in the previous embodiment there is a single sensor. In this case, the sensor is a bar code reader which provides one type of signal when it reads the boundary marker code and another type of signal when it reads the obstacle marker code.

Alternatively, the boundary markers 40 can be formed of a wire and the obstacle markers can be formed of bar coded posts, or vice versa. A further alternative, discussed hereinabove, uses markers only for the boundary and contact or proximity sensors for sensing the proximity of an obstacle.

It will be appreciated that the markers can be formed of any suitable marking unit and that the robot includes a sensor or sensors capable of recognizing the information which the marking unit provides to determine proximity. Such sensors and marking units are discussed in detail in U.S. patent application Ser. No. 08/554,691. The number of sensors used is of little importance to the present invention; however, the information from the types of sensors must be separatable.

It will be appreciated by persons skilled in the art that the present invention is not limited by what has been particularly shown and described herein above. Rather the scope of the invention is defined by the claims that follow.

What is claimed is:

1. A robotic system for systematically moving about an area to be covered, the system comprising:

at least one boundary marker located along an outer edge of the area to be covered;

a robot for systematically moving about said area to be covered, said robot including a navigation system for navigating said robot in substantially straight lines, substantially parallel to each other, originally from an initial location and for turning said robot when said robot encounters said at least one boundary marker; and a sensor unit for sensing proximity to said at least one boundary marker.

2. The system of claim 1, wherein said sensor unit includes means for indicating proximity to an obstacle within said area to be covered and said navigation system includes means for turning said robot when said means for indicating indicate proximity to an obstacle.

3. The system of claim 2, wherein said means for indicating is selected from the group comprising: a contact sensor or a proximity sensor.

4. The system of claim 2, wherein said navigation system includes means for counting the number of laps needed to cover the area between an obstacle and said at least one boundary marker.

5. The system of claim 2, additionally comprising:

at least one obstacle marker located along the outer edge of an obstacle.

6. The system of claim 5, wherein said at least one boundary marker is an electrified wire receiving a first signal and said at least one obstacle marker is an electrified wire receiving a second signal.

7. The system of claim 5, wherein said at least one boundary marker is a post having a first bar code and said at least one obstacle marker is post having a second bar code.

8. A robotic system for systematically moving about an area to be covered, the system comprising:

at least one boundary marker located along an outer edge of said area to be covered;

at least one obstacle marker located along the outer edge of an obstacle within said area to be covered;

a robot for moving about said area to be covered; and a sensor unit for sensing proximity to said at least one boundary marker and said at least one obstacle marker and for differentiating between said at least one boundary marker and said at least one obstacle marker.

9. A method of systematically moving a robot about an area comprising at least one boundary marker located along at least a portion of an edge of an area to be covered, the method comprising:

navigating said robot in a first substantially straight line from an initial location;

sensing proximity of said robot to said at least one boundary marker;

turning said robot when said robot encounters said boundary marker; and navigating said robot in a second substantially straight line, said second substantially straight line being substantially parallel to said first substantially straight line.

10. A method of systematically moving a robot about an area comprising at least one boundary marker located along an outer edge of the area and at least one obstacle marker located along an edge of an obstacle within said area, the method comprising:

providing said robot to said area to be covered;

sensing the proximity to at least one of said at least one boundary marker or said at least one obstacle marker; and determining whether said at least one of said at least one boundary marker or said at least one obstacle marker is a boundary marker or an obstacle marker.

* * * * *